United States Patent [19]

St. John

[11] Patent Number: 4,557,709
[45] Date of Patent: Dec. 10, 1985

[54] BELT TENSIONER SYSTEM

[75] Inventor: Richard C. St. John, North Canton, Ohio

[73] Assignee: I Corp., Akron, Ohio

[21] Appl. No.: 374,020

[22] Filed: May 3, 1982

[51] Int. Cl.$^4$ .............................................. F16H 7/12
[52] U.S. Cl. ..................... 474/117; 474/135
[58] Field of Search ............... 474/112, 115, 117, 133, 474/134, 135, 111, 140

[56] References Cited

U.S. PATENT DOCUMENTS

| | | | |
|---|---|---|---|
| 30,172 | 9/1960 | Whitwell | 160/298 |
| 447,301 | 3/1891 | Dootson | 474/135 X |
| 685,516 | 10/1901 | Kennedy | 105/106 |
| 1,232,391 | 7/1917 | Pierce | 474/112 |
| 1,645,576 | 10/1927 | Beconnier | 188/83 |
| 1,701,820 | 12/1925 | Morse | 474/112 |
| 1,841,834 | 1/1932 | McRaven | 474/135 |
| 1,917,911 | 3/1929 | Thomas | 188/250 R |
| 2,611,148 | 4/1948 | Rappl | 15/250.25 |
| 3,136,170 | 6/1964 | Murray | 474/135 |
| 3,707,092 | 12/1972 | Piech | 474/101 |
| 3,975,965 | 8/1976 | Speer | 474/135 |
| 4,031,761 | 6/1977 | Fisher et al. | 74/15.63 |
| 4,144,772 | 3/1979 | Brackin et al. | 474/135 |
| 4,145,934 | 3/1979 | Sragal | 474/135 |
| 4,231,452 | 11/1980 | Kraft | 188/334 X |
| 4,285,676 | 8/1981 | Kraft | 474/135 |
| 4,351,636 | 9/1982 | Hager | 474/135 |
| 4,392,840 | 7/1983 | Radocaj | 474/117 |

FOREIGN PATENT DOCUMENTS

| | | | |
|---|---|---|---|
| 2608277 | 9/1977 | Fed. Rep. of Germany | 474/134 |
| 3043287 | 6/1981 | Fed. Rep. of Germany | 474/112 |
| 279415 | 3/1952 | Switzerland | 474/135 |

Primary Examiner—Leslie A. Braun
Assistant Examiner—Dwight G. Diehl
Attorney, Agent, or Firm—Reese Taylor

[57] ABSTRACT

A belt tensioning system for maintaining consistent and constant tension in a serpentine drive system which includes a series of pulleys and an endless belt interconnecting the pulleys. The tensioning system utilizes a low rate power spring which acts on the idler pulley, and through the idler pulley on the belt, and is suitable to maintain tension over a broad range of belt length variation and pulley locations and provide damping adequate to prevent undue pulley oscillation over a broad range of system vibration conditions. In one form of the invention, the spring itself is effectively fixed at one end to the engine block and at the other end to a tensioner housing so as to operate on the idler pulley and maintain the tension and provide the damping. The hysteresis of the spring, responding to pulley movement, thus assists in the damping. In another form of the invention, the system is further protected against operating at resonance by using, in addition to the spring, a spring-loaded brake arrangement which acts on the tensioner housing to create an overdamped condition. In still another form of the invention, the spring can be mounted eccentrically with respect to the central axis of its housing to conserve space while retaining the tensioning and damping characteristics.

17 Claims, 10 Drawing Figures

BELT TENSIONER SYSTEM

FIELD OF THE INVENTION

This invention relates, in general, to serpentine belt drive systems and relates, in particular, to a method for constantly and consistently applying tension to the system to prevent undesirable slippage and possible belt failure and further to prevent undue oscillation of the system components.

DESCRIPTION OF THE PRIOR ART

While the invention is not necessarily limited to automotive applications, it does find particular utility there. In that regard, it is well known that many vehicle accessories such as the alternator, water pump, etc., are now often operated by a single endless belt driven by the crankshaft in what is commonly called a serpentine system.

It is, of course, desirable to maintain a constant tension on the belt to insure proper operation of the accessories. This is, however, sometimes difficult to achieve due to changes in belt length caused by belt wear, temperature variations, etc. Accordingly, in both automotive and non-automotive applications, various attempts have been made to compensate for these variations.

The prior art generally includes idler rolls which engage the belt and diverse spring type drag or damping means to preclude or reduce retrograde movement of the idler rolls in the various types of pulley systems.

Rappl U.S. Pat. No. 2,611,148 discloses a device which is intended to relieve a driving cable from excessive and sudden strain. A coil spring is utilized to apply uniform tension to the cables with the spring acting on a flange which in turn carries the pulley.

Sragal U.S. Pat. No. 4,145,934 discloses the utilization of a relief spring working against a lever to maintain constant tension on the idler roller. A wedge is utilized as a "nonreturn" device to hold the lever and adjust it to the desired position. This wedge is actuated by a spring and operates on an eccentric cam thus preventing counterclockwise or loosening movement while permitting clockwise or tightening movement.

Morse U.S. Pat. No. 1,701,820 discloses a coil spring which works on an eccentric to apply belt tensioning movement wherein a latch serves to prevent outward swinging retrograde movement.

Kennedy U.S. Pat. No. 685,516 discloses an attempt to prevent sudden vibrations and retrograde movement by utilization of a dash pot.

Whitwell U.S. Pat. No. 30,172 discloses a spring-loaded brake while Pierce U.S. Pat. No. 1,232,391 utilizes a coil spring which is adjustable to take up the slack in a drive chain system. Thomas U.S. Pat. No. 1,917,911 shows a relatively conventional brake shoe structure which is not used in the environment of this invention.

Piech U.S. Pat. No. 3,707,092 is directed to solving problems of varying coefficients of expansion between a drive chain and the housing for the chain. Fisher U.S. Pat. No. 4,031,761 discloses a belt tensioner used to control tension in a serpentine belt drive system. The tensioner is described, however, as being conventional in nature and not disclosed in any detail.

While the foregoing patents disclose various approaches to the general problem of tensioning belt drives or analogous systems for optimum operating results, none of them are believed to disclose the unique system disclosed and claimed herein.

In this regard, it should be noted that, in a serpentine drive system of the character involved in this particular invention, a power pulley is driven by a prime mover such as a crankshaft and becomes the driving member for the belt system. All of the other pulleys are driven members. As already noted, the nature of systems such as this is that the belt must be kept in proper tension in order to properly drive the engine components or accessories and to avoid undesirable slippage, undue belt wear, and possible belt failure.

However, the nature of belt driven mechanical systems is such that the driving and driven pulleys cannot always be positioned to ensure that the correct tension is always applied to the belt and the belt itself will change length due to wear, temperature variations, etc., and therefore, the solution has been generally to provide a belt tensioner as illustrated by some of the prior art patents previously discussed.

The present invention represents an improved, simplified, yet highly effecient, means for resolving this problem.

SUMMARY OF THE INVENTION

The tensioner of the present invention is designed to provide appropriate spring force to maintain tension over a broad range of belt length and pulley locations and also to provide damping that is adequate to prevent undue tension or pulley oscillation over a broad range of system vibration conditions.

It should be noted that this vibration is often in the region of the critical frequency of one or more of the system components. In other words, some system components will resonate or vibrate in an uncontrolled and possibly destructive manner at some speed within the operating range of the system. In addition to maintaining tension, the present invention is thus also intended to provide protection against such destructive resonance.

In summary, the present invention is intended to achieve constant tensioning of the belt system by utilization of a low rate power spring operating on the idler pulley which engages the belt. This spring provides a change in torque that is appropriate for a relatively large change in the belt length or pulley positioning. One end of the spring is engaged with an arbor which is, in turn, secured to the engine block and which is, in turn, carried in a housing connected to the tensioner pulley or idler roll itself. Thus, the spring has one end effectively secured to the block and the opposed end effectively secured to the housing so as to act on the idler pulley. The spring reacts to forces within the system transmitted by the idler pulley to the housing to maintain constant tension. This may promote low speed resonant frequencies which increase the likelihood that the tensioner critical frequency will occur under some operating conditions, although the spring, of course, does provide a damping effect and, in many cases, that damping effect is adequate.

The invention also contemplates, in another embodiment, protecting against operating at resonance by the provision of a spring-loaded brake capable of providing asymmetrical torque consisting of two shoes mounted between two plates and pivot pins upon which the shoes may rotate. The pivot pins are affixed to the plates which are, in turn, affixed to the same center shaft or arbor as the power spring. These plates are designed to be free to rotate inside the housing with the springs between the shoes causing the shoes to rub against or contact the inner surface of the housing. This friction provides a damping effect and actually provides an over-damped condition. In other words, the brakes are designed so that if the power spring is deflected and released instantly, the assembly will not immediately return to a zero load condition because the friction between the shoe and the housing will oppose this motion.

Thus, the system is designed so that it is easy for the tensioner to tighten the belt under the influence of the spring but difficult for the belt to move the tensioner against the influence of the brake.

In the event the system provides a disturbing frequency that matches the resonant frequency of the tensioner spring-mass system, large amplitudes which would harm the system would be almost impossible to encounter because the friction brake always resists motion.

It has also been found that, in certain instances, the power spring can be mounted about an axis which is offset from the center line of its associated housing. This eccentric mounting permits full damping action while conserving space by reducing the overall housing size.

Accordingly, production of an improved belt tensioner system of the character above described becomes the principal object of this invention with other objects thereof becoming more apparent upon a reading of the following brief specification considered and interpreted in view of the accompanying drawings.

BRIEF DESCRIPTION OF THE PREFERRED EMBODIMENTS

Figures 1, 2:
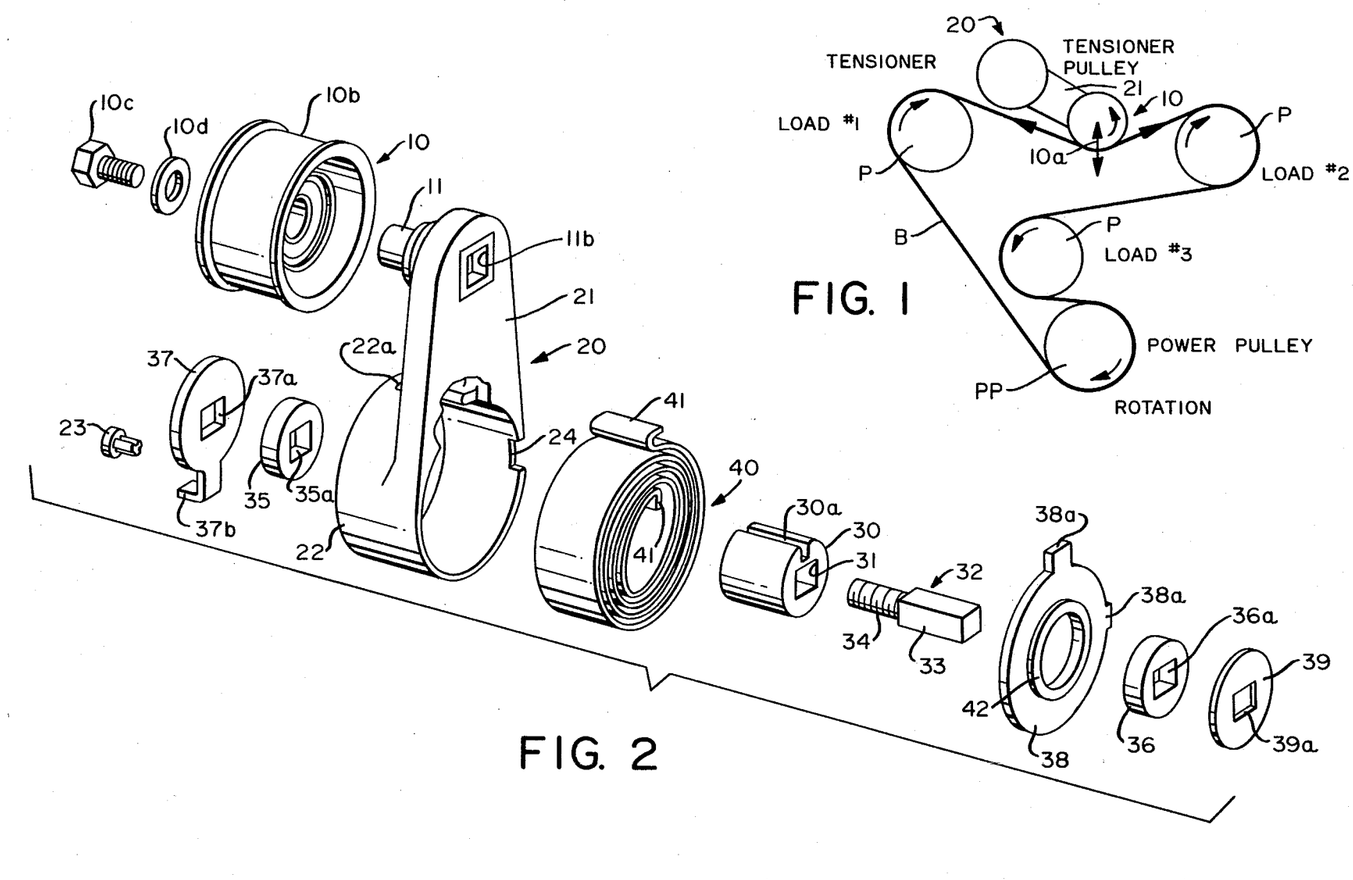
FIG. 1 is a schematic view of a typical belt system.
FIG. 2 is an exploded view of one embodiment of the invention.

Referring first to FIG. 1 of the drawings, which schematically shows a typical serpentine belt drive system, it will be noted that the tensioning system includes an idler or tensioner pulley, generally indicated by the numeral 10, and a tensioner, generally indicated by the numeral 20, which is connected to the pulley 10 by a common housing so that the tensioner 20 acts on and controls the pulley 10. The system also includes a plurality of driven pulleys or sheaves P which represent and provide the load placed on the system, and a power or driven pulley PP all interconnected by an endless belt B. Thus, the tensioner 20 is intended to act on the belt B through idler pulley 10 to maintain constant and consistent tension thereon as will now be described.

It will be understood that power pulley PP is driven by the engine through the crank shaft (not shown) and that the driven pulleys P are connected to various vehicle components or accessories such as the alternator, water pump, etc. It should also be understood that the tensioner 20 is secured to a suitable mounting point on the engine block by suitable means, which will be described herein, and is capable of pivotal movement about its mounting point so that movement is possible in the direction of the arrow 10a in response to movement of the belt and to forces imparted by the tensioner 20 as will be described.

The Embodiment of FIGS. 1 Through 4

Figures 3, 4:
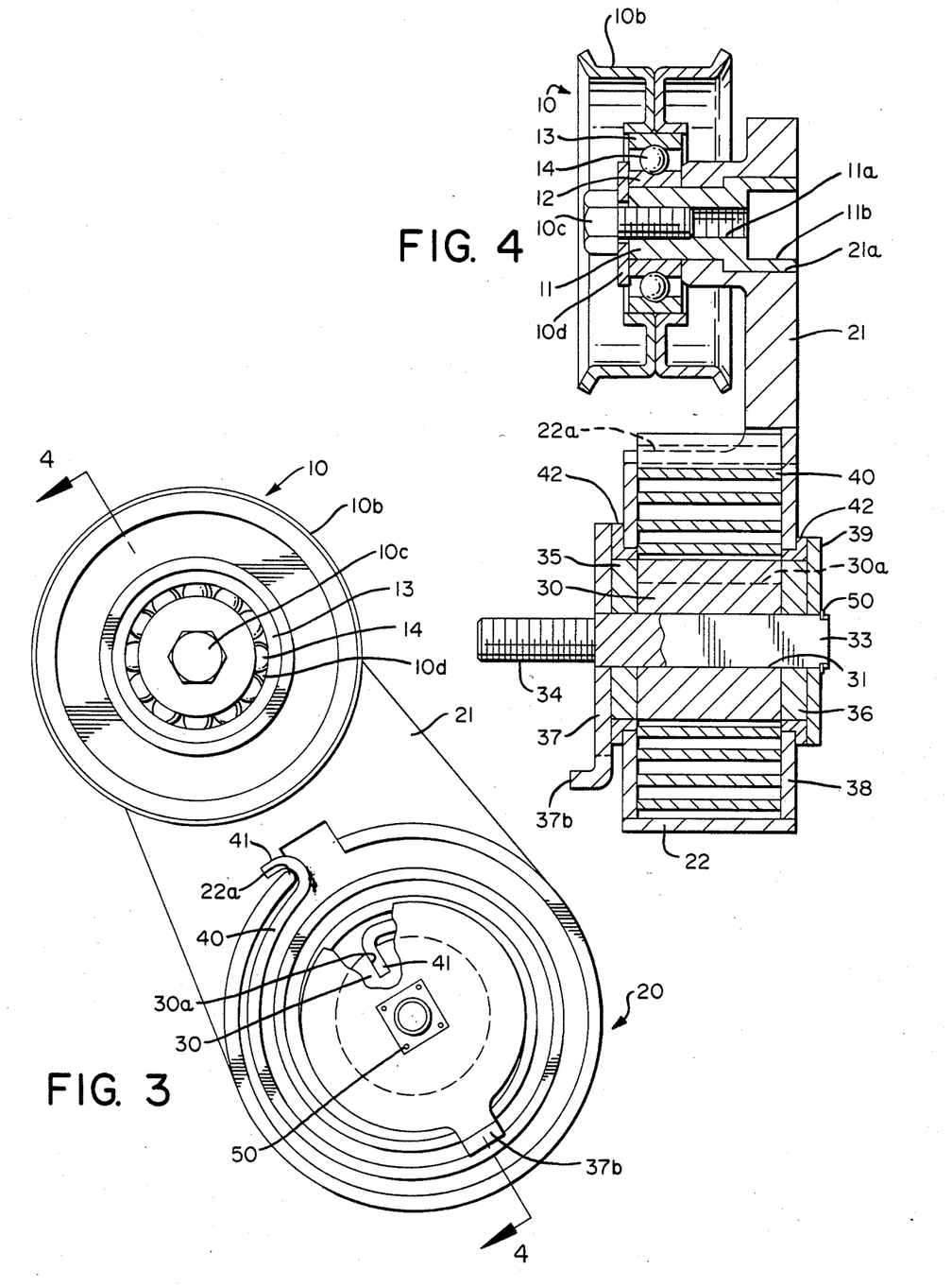
FIG. 3 is a side elevational view, partially in section, illustrating the form of the invention of FIG. 2.
FIG. 4 is a sectional view taken along the line 4—4 in FIG. 3.

Referring first then to FIGS. 1 through 4 for a description of one form of the invention, it will be noted that idler pulley 10 normally contacts belt B and is generally conventional in design including a pulley sheave 10b which engages the belt B and which is mounted on a shaft 11 which in turn receives inner and outer bearing races 12 and 13 and ball bearing 14. This enables the pulley sheave 10b to freely rotate about the longitudinal axis of the shaft 11. The pulley sheave 10b may be held against axial separation from shaft 11 either by a stud, by staking, or by providing the shaft with the tapped and threaded bore 11a and bolt and washer 10c and 10d as illustrated (FIG. 4).

It will also be noted that one end of shaft 11 has a square recess 11b (FIG. 4). This makes it possible to eliminate the usual arm which is used to cock the tensioner. In this regard, "cocking" refers to moving the tensioner pulley out of the way so that the belt may be positioned about the other sheaves in the system initially or during belt replacement. In the present invention, this can be accomplished by simply inserting a suitable wrench in opening 11b and moving the sheave away from belt B.

The housing shaft 11, one end of which carries the bearing 14, has its other end press fit or otherwise secured in housing arm 21 of tensioner 20 in the appropriate bore 21a thereof so that movement of the belt B and the tensioner pulley 10 will be transmitted to the housing and the various tensioning and damping components carried therein.

The tensioner 20 includes a hollow cylindrical housing body 22 which is interconnected to pulley assembly 10 by housing arm 21 as just described and which receives the various tensioning and damping components interiorally thereof as will now be described.

Thus, in the form of the invention illustrated in FIGS. 2, 3, and 4, an elongate arbor body 30 is received centrally of the housing body 22 and includes a through central bore 31 having a square or rectangular cross-section, and an elongate keyway 30a for receipt of one end of the spring as will be described.

Received within bore 31 of arbor 30 is an elongate hub 32 having a body portion 33 with a cross-sectional configuration complemental to that of bore 31 and a threaded extension 34 which can be mounted on the engine block or other point of support on the vehicle. Alternatively, hub 32 can be provided with a threaded bore opening into one end thereof and be secured to the block by an independent bolt or even provided with a smooth bore to be secured by a bolt or bolt and nut.

It will be understood in any case that the tensioner 20 will be firmly mounted on the engine block or other selected support surface through the hub 32 and arbor 30.

Also received interiorally of the housing body 22, in the form of the invention illustrated in FIGS. 2, 3, and 4, is the power spring 40 which is similar to a low rate clock spring terminating in opposed ends 41,41. One of these opposed ends 41 of the spring 40 is received in the axially extending slot 30a of the arbor 30 and the other is received in the elongate opening 22a of the housing body 22.

Also included in tensioner 20 are opposed journals 35 and 36 which have central openings 35a and 36a which are complemental to the exterior configuration of hub 32. These journals are thus received on opposed ends of hub 32 and about the opposed ends of arbor 30.

A cover plate 37 is also provided to close off the one end of housing 22. This plate has a central bore 37a contoured complementally to the exterior of hub 32 for receipt thereon and a locator arm 37b projecting from its edge. Fixed to one face of housing 22 is a stop 23 and locator arm 37b is thus accurately positioned in abutment with the stop 23.

The opposed end of housing 22 also receives a cover plate 38 which has one or more locator tabs 38a projecting radially from its periphery for engagement with locating notches 24 on housing 22.

Cover plate 38 also has a central opening within which is received a steel bearing 42 and the powdered metal journal 36, which fits hub 32 and is received interiorly of this bearing. Similarly, a second bearing 42 is associated with journal 35. These relatively large, high strength metal pair type bearings are used in recognition of the potentially severe oscillatory motion that occurs in serpentine applications. These bearings permit long life without excessive damping that can impair the performance of the system as a whole.

Finally, a retention disc 39 with a central aperture 39a complemental to hub 32 is received on the end of the hub and the assembly is secured against axial separation by staking as at 50.

With the tensioner thus assembled, changes in the length of belt B due to wear, temperature variations, etc., will be compensated for by spring 40 acting on housing 22 and idler 10.

Thus, with one end 41 of the spring engaging the housing body 22 at 22a and the other end 41 engaging arbor 30, which is held against movement due to its engagement with hub 22, forces applied to tensioner pulley 10 in the direction of arrow 10a (see FIG. 1) will be resisted by the power spring 40 and a damping effect will be achieved on tensioner pulley 10 and thus on the belt B and on the system. This will result in maintaining constant tension on belt B under most circumstances. Thus if the belt loosens, the idler pulley 10 will tend to move downwardly (see FIG. 1) and take the housing 22 and arm 21 with it. The spring 40, which has one end engaged with housing 22, will permit some degree of movement in this direction. If the belt tightens, it will tend to force the idler pulley 10 upward and spring 40 will resist. In this way, essentially constant tension may be maintained.

Figure 4A:
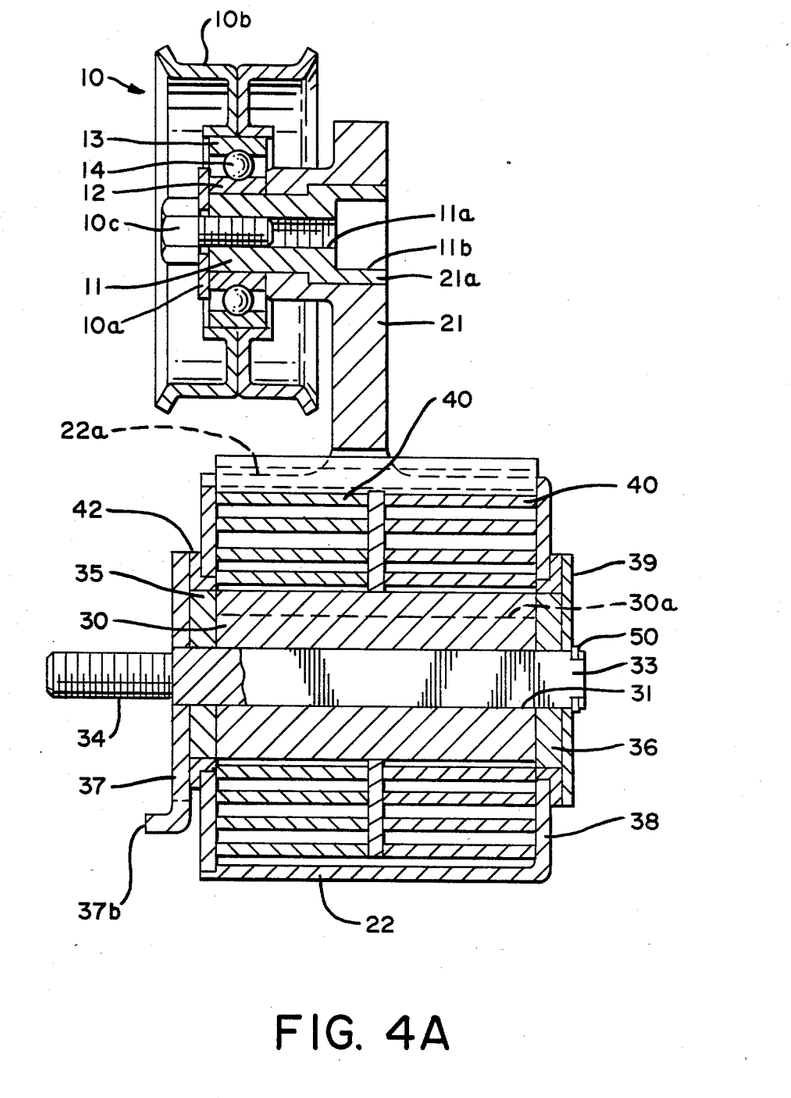
FIG. 4A is a sectional view similar to that of FIG. 4 showing a tensioner having two springs.

It should be noted that while one spring 40 is illustrated, in certain applications, a pair of such springs could be employed as shown in FIG. 4A at 40,40.

It should also be noted that the structure of FIGS. 2 through 4 will, in most applications, be adequate both to maintain tension and provide damping.

The Embodiment of FIGS. 1 and 5 Through 7

Figures 5, 6:
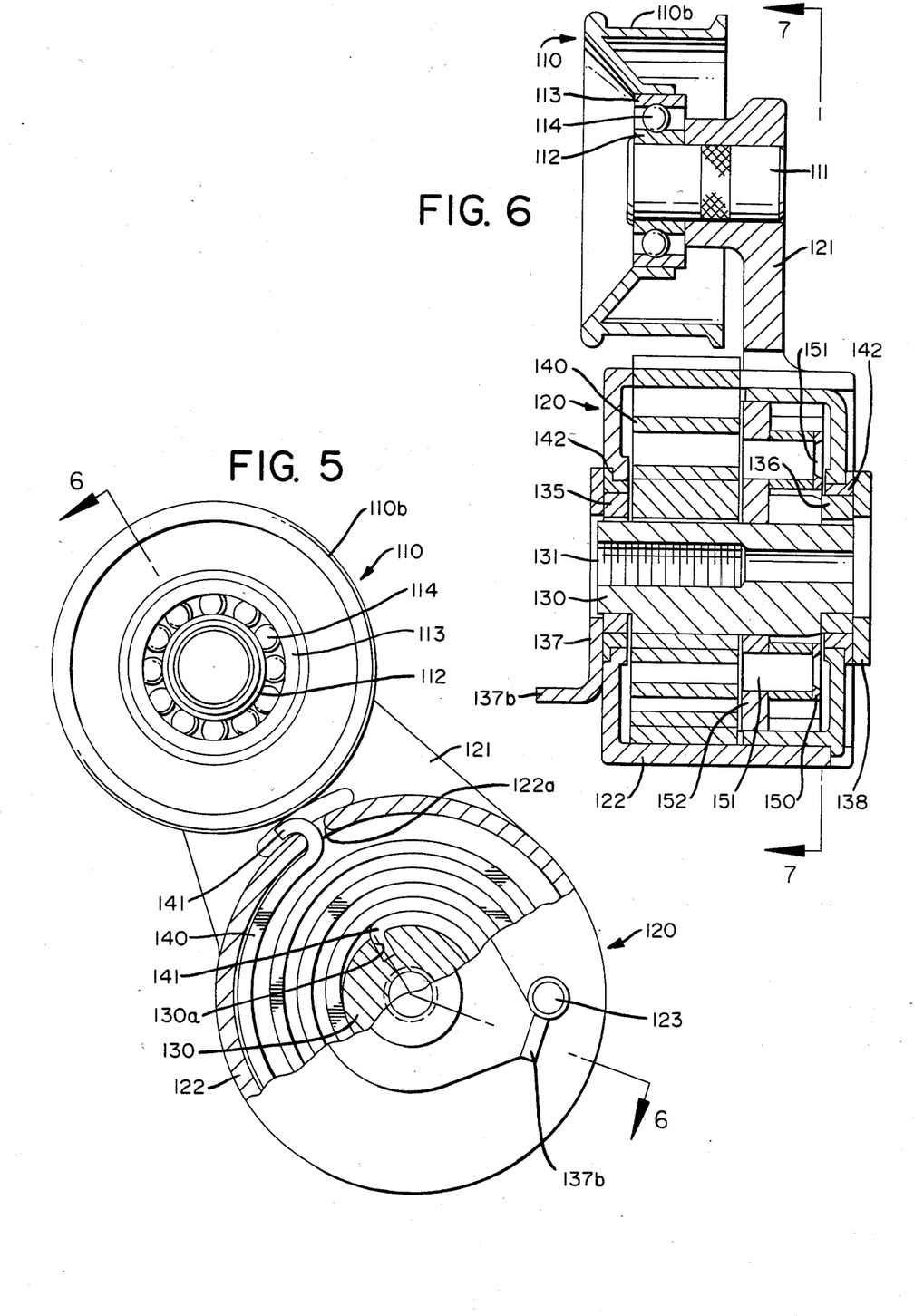
FIG. 5 is a side elevational view, partially in section, illustrating another form of the invention.
FIG. 6 is a sectional view taken along the line 6—6 of FIG. 5.
Figure 7:
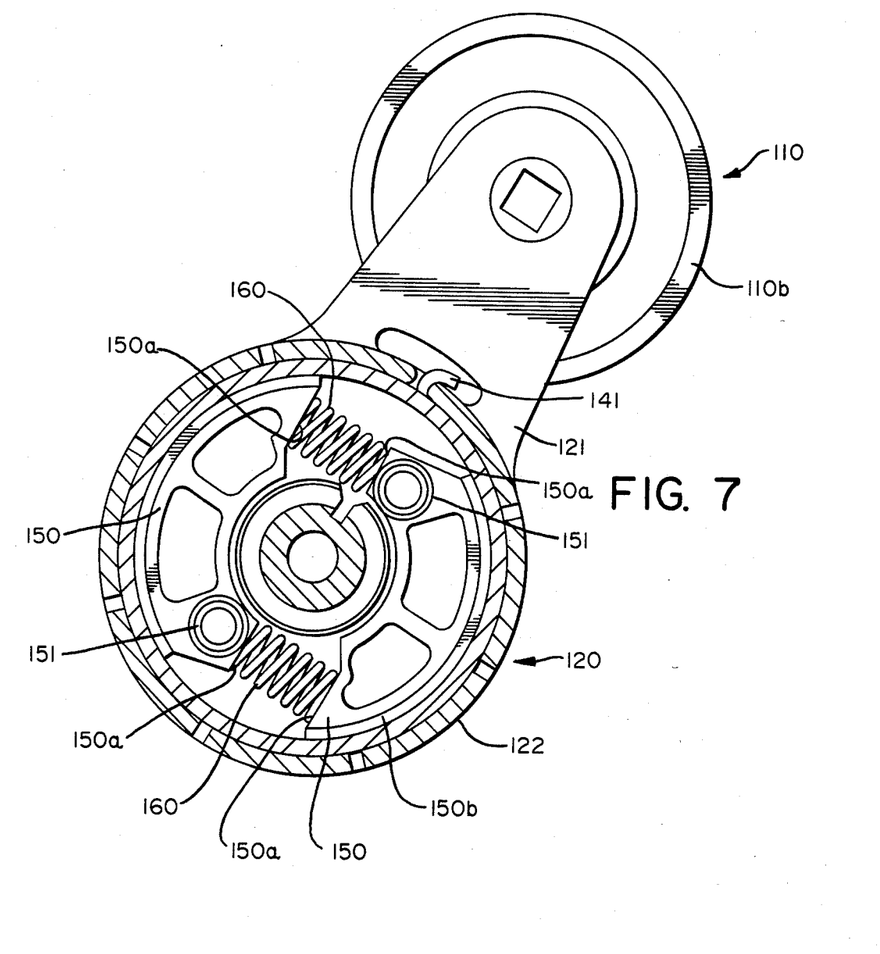
FIG. 7 is a view taken along the line 7—7 of FIG. 6, partially in section.

In some instances, however, additional damping may be desired and the form of the invention illustrated in FIGS. 5 through 7 is intended to provide that capability in a system such as illustrated in FIG. 1.

Here again, an idler pulley 110 includes a sheave 110b and is received on shaft 111 of housing arm 121. The mounting is achieved with inner and outer bearing races 112 and 113 and bearing 114 so that sheave 110b is freely rotatable about the axis of shaft 111.

The sheave 110 is again connected to tensioner housing 122 by arm 121 so that forces acting on sheave 110 will be transmitted to housing 122.

The housing 122 contains the tensioner 120 which includes an arbor 130 and a spring 140 which has one end 141 received in opening 122a of housing 122. The housing assembly is also completed by opposed journals 135 and 136, bearings 142,142 and cover plates 137 and 138. This structure, while differing in some slight detail, as illustrated, is structurally and operationally similar to that of FIGS. 2 through 4. For example, in FIGS. 2 through 4, hub 32 has a threaded extension 34 which can be secured to the supporting surface. In FIGS. 5 through 7, arbor 130 has a threaded interior bore 131 which, in cooperation with a suitable bolt (not shown), serves for mounting the tensioner on the mounting surface. Stop 123 is also provided to cooperate with locator arm 137b.

In this embodiment, however, as noted above, also received within the housing body 122 is a friction shoe assembly for additional damping capacity. This assembly includes two identical plates or shoes 150. These plates are rotatably received on the pivots 151,151 of a brake arbor mounting plate 152 which is, in turn, fixed to the periphery of arbor 130.

The plates or shoes 150,150 are rotatable about pivots 151,151 but opposed springs 160,160, which rest on and extend between wall surfaces 150a, 150a of the shoes, exert force diametrically of the housing 122 toward the inner peripheral surface of the housing and cause the friction lining 150b, which is carried on the outer edges of the shoes, to rub against the inner surface of housing 122. It should be noted here that the separate lining for the shoes can be eliminated, if desired, and a suitable friction material, such as powdered metal, could be used to fabricate the shoes themselves.

The damping assemblies, including the spring 140 and the shoe assembly, are held together in the housing by the journals and cover plates as already described.

Thus, in one instance (FIGS. 2 through 4), the spring 40 provides an appropriate change in torque even though there may be a relatively large change in belt length or pulley position. This will provide suitable belt tension even after aging and stretching of belt B or changes in belt length due to temperature variations. In many applications, this may provide sufficient damping and torque.

In the other instance however (FIGS. 5 through 7), further damping and protection against operating at resonance can be provided by the brake shoes 150,150. These shoes are free to rotate about the pivot pins 151,151 as noted, but the springs 160,160 tend to cause them to rub against housing 122. The friction thus generated causes the damping. This braking arrangement provides asymmetrical torque and the shoes aid the tensioner in resisting tightening with a relatively greater torque while providing a lesser torque when the belt is loosening. The torque ratio may vary from approximately 3:1 to 10:1 as required. In reality, this causes an over-damped condition because if the spring 140 is deflected and released, the assembly will not return to a zero load condition immediately because the brake shoe friction will resist such motion. This causes a delay and reduces the risk of the system reaching a frequency which matches its resonant frequency.

Figures 8, 9:
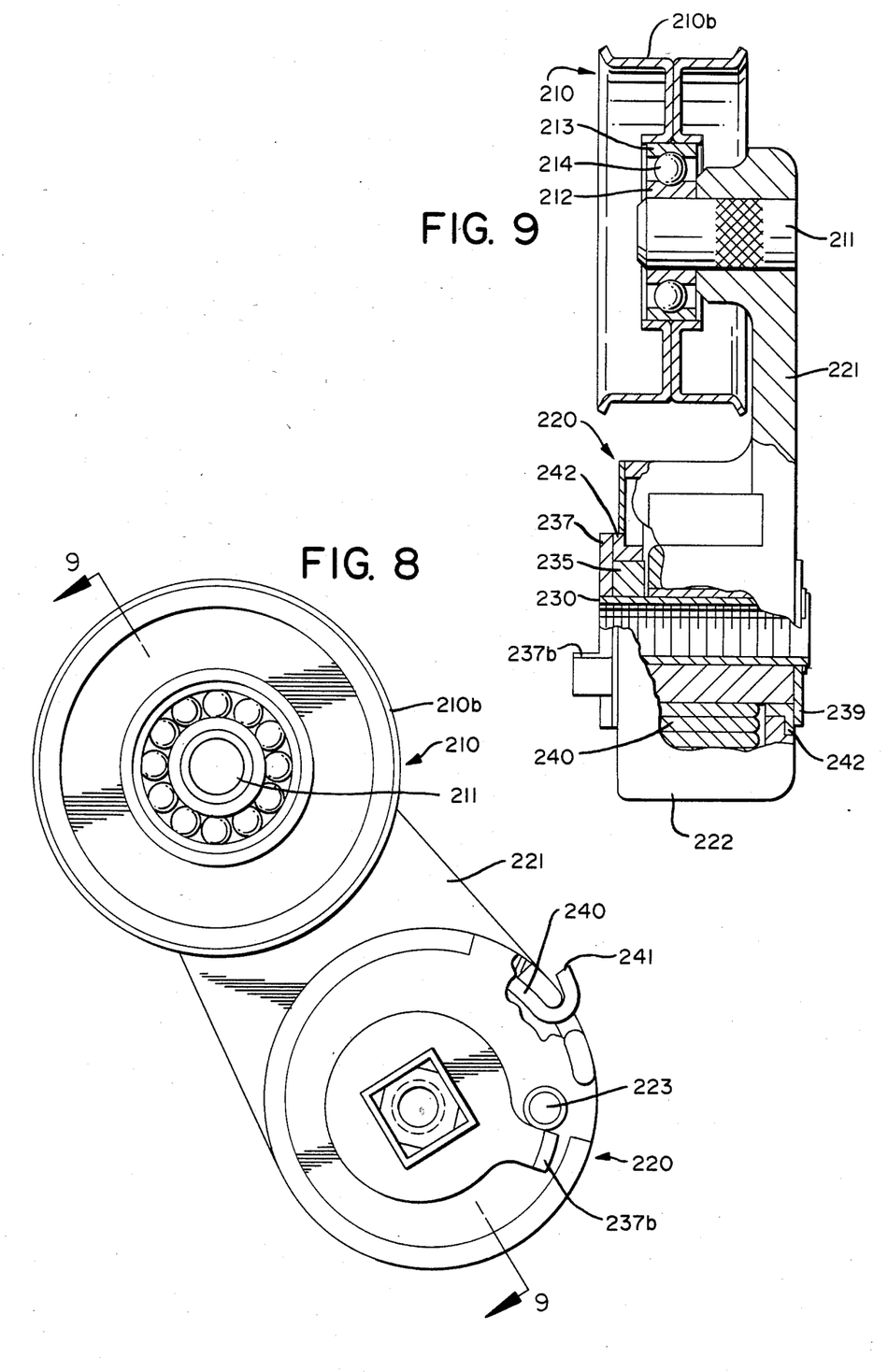
FIG. 8 is a side elevational view, partially in section, illustrating another form of the invention.
FIG. 9 is a sectional view taken along the line 9—9 of FIG. 8.

The Embodiment of FIGS. 1, 8 and 9

FIGS. 8 and 9 illustrate yet another form of the invention for use in a system such as illustrated in FIG. 1 which has particular utility where space is critical.

Here the idler pulley 210 includes pulley sheave 210b which engages belt B (see FIG. 1) and is engaged with shaft 211 through bearing races 212 and 213 and bearing 214. It will be noted that a two piece sheave is illustrated in this embodiment, as in the embodiment of FIGS. 1 through 4, but it should also be understood that the precise form of the sheave is not critical to the invention.

Again, the idler pulley 210 is connected to housing 222 of tensioner 220 through shaft 211 and housing arm 221.

Also, again, spring 240 has its opposed ends 241,241 in engagement with arbor 230 which is secured to the supporting surface of the vehicle in suitable fashion and with housing 222.

Additionally, bearings 242,242 and journals 235,236 surround the arbor and cover plate 237 has an arm 237b which engages stop 223.

This form of the invention, however, differs from those illustrated in FIGS. 2 through 7 in that the arbor 230 is mounted in housing 222 so that its longitudinal axis is offset with respect to the central axis of the housing.

In this way, the spring 240 is of the same size and strength as, for example, spring 140 of FIGS. 5 and 6 but the effective housing size has been reduced substantially. Thus, the dampening and torque properties of the tensioner are held relatively constant while important space requirements are significantly reduced.

While a full and complete description of the invention has been set forth in accordance with the dictates of the Patent Statutes, it should be understood that modifications can be resorted to without departing from the spirit hereof or the scope of the appended claims.

Thus, for example, the engagement point of the end of the springs with the housing can be varied as can be seen by comparing FIGS. 5 and 8.

What is claimed is:

1. A belt tensioner for constantly, automatically maintaining substantially constant tension in the endless belt of a serpentine belt drive system, comprising:
   (A) an idler pulley sheave adapted to engage the belt;
   (B) a tensioner including
      (1) a unitary hollow housing and
      (2) an elongate arm extending from said housing and interconnecting said housing and said idler pulley sheave;
   (C) said housing having a housing body and carrying an arbor adapted to be fixed to a supporting surface for rotatably supporting said housing body relative to the supporting surface;
   (D) at least one optimum rate power spring having its opposed ends in engagement with said arbor and said housing respectively
      (1) whereby forces from said belt applied to said idler pulley are constantly resisted by the frictional engagement of the coils of said spring and constant static tension is maintained in said belt drive system.

2. The tensioner of claim 1 wherein two said springs are employed.

3. The tensioner of claim 1 wherein opposed bearing metal frictional pivot bearings are carried by said housing body in supporting engagement with opposed ends of said arbor.

4. The tensioner of claim 1 wherein said housing also carries a friction shoe assembly for asymmetric damping, including
   (A) a first shoe pivotally mounted in said housing;
   (B) a second shoe pivotally mounted in said housing in opposed, complementary relationship to said first shoe;
   (C) a compression member associated with each said shoe and having one end attached to said arbor and an opposed end in engagement with said shoe to normally urge said shoe into engagement with an inner peripheral surface of said housing, whereby said shoes are self-energized or de-energized depending upon the direction of rotation of said housing.

5. The belt tensioner of claim 1 wherein said housing has a central axis to permit oscillation of the housing relative to said arbor; and said arbor of said housing is offset with respect to the central axis of said housing to improve the working range of the tensioner by providing additional clearance between the exterior of said housing and the belt.

6. A belt tensioner adapted to be mounted on a mounting surface for constantly, automatically maintaining tension in an endless belt in a serpentine belt drive system, comprising:
   (A) a unitary housing assembly including
      (1) a housing body with a central axis and
      (2) an elongate housing arm projecting from said housing body;
   (B) a belt contacting idler pulley sheave rotatably mounted on the distal end of said housing arm;
   (C) tensioner means carried by said housing body and including
      (1) a hub mounted in said housing and adapted to be secured to a mounting surface,
      (2) an arbor body mounted on said hub for rotatably supporting said housing body relative to the supporting surface, and
      (3) optimum rate power spring means having one end engaged with said arbor and the opposed end engaged with said housing body
         (a) whereby forces from the belt applied to said idler pulley sheave are resisted by the frictional engagement of the coils of said spring means and constant tension is maintained in said belt.

7. The tensioner of claim 6 wherein said tensioner means include two said power springs.

8. The tensioner of claim 6 wherein opposed frictional bearing metal bearings are carried by said housing body in supporting engagement with opposed ends of said hub.

9. The tensioner of claim 6 wherein said hub is disposed with its axis parallel to and radially offset from the axis of said housing to improve the working range of the tensioner by providing additional clearance between the exterior of said housing and the belt.

10. The tensioner of claim 6 wherein said housing body also carries
   (A) opposed journals received on opposed ends of said hub; and
   (B) opposed cover plates engaging said journals and closing off opposed sides of said housing body.

11. The tensioner of claim 10 wherein
   (A) a locating stop is mounted in projecting relationship on one side of said housing body; and
   (B) one of said cover plates has a projecting locator arm adapted to engage said locating stop.

12. The tensioner of claim 6 wherein said hub has an integral, threaded projecting portion adapted to engage the mounting surface.

13. The tensioner of claim 6 wherein said housing also carries a friction shoe assembly for asymmetric damping, including
   (A) a first shoe pivotally mounted in said housing
   (B) a second shoe pivotally mounted in said housing in opposed complementary relationship to said first shoe;
   (C) a compression member associated with each said shoe and having one end attached to said arbor and an opposed end in engagement with said shoe to normally urge said shoe into engagement with an inner peripheral surface of said housing whereby said shoes are self-energized or deenergized depending upon the direction of rotation of said housing.

14. A belt tensioner for constantly, automatically maintaining tension in an endless belt in a serpentine belt drive system, comprising:
   (A) a tensioner including
      (1) a unitary hollow housing and
      (2) an elongate arm projecting from said housing;
   (B) an idler pulley sheave rotatably mounted on the projecting end of said arm for engaging the belt;
   (C) an arbor mounted within said housing and having a through central bore;
   (D) an elongate hub received within said arbor and adapted to engage a supporting surface;
   (E) at least one optimum rate power spring having opposed ends, one of which engages said arbor and one of which engages said housing;
   (F) opposed journals disposed on opposed ends of said hub;
   (G) opposed cover plates closing off opposed ends of said housing;
   (H) opposed bearings carried by said cover plates in encircling engagement with said journals;
   (I) a stop secured in projecting relationship to one end of said housing plates; and
   (J) one of said cover plates having a normally projecting locator arm for engagement with said stop, said housing being rotatable about the axis of said arbor with respect to the mounting surface, and
      (1) whereby forces from the belt applied to said pulley sheave are resisted by the frictional engagement of the coils of said power spring.

15. The tensioner of claim 14 wherein two said springs are employed.

16. The tensioner of claim 14 wherein said housing also carries a friction shoe assembly for asymmetric damping, including
   (A) a first shoe pivotally mounted in said housing
   (B) a second shoe pivotally mounted in said housing in opposed complementary relationship to said first shoe;
   (C) a compression member associated with each said shoe and having one end attached to said arbor and an opposed end in engagement with said shoe to normally urge said shoe into engagement with an inner peripheral surface of said housing, whereby said shoes are self-energized or de-energized depending upon the direction of rotation of said housing.

17. The belt tensioner of claim 14 wherein said arbor of said housing is offset with respect to the central axis of said housing to improve the working range of the tensioner by providing additional clearance between the exterior of said housing and the belt.

* * * * *